US012644747B2

(12) United States Patent
Laursen et al.

(10) Patent No.: US 12,644,747 B2
(45) Date of Patent: Jun. 2, 2026

(54) FLOW METER

(71) Applicant: Kamstrup A/S, Skanderborg (DK)

(72) Inventors: Peter Schmidt Laursen, Skanderborg (DK); Lasse Pilegaard, Skanderborg (DK)

(73) Assignee: KAMSTRUP A/S, Skanderborg (DK)

( * ) Notice: Subject to any disclaimer, the term of this patent is extended or adjusted under 35 U.S.C. 154(b) by 336 days.

(21) Appl. No.: 18/454,123

(22) Filed: Aug. 23, 2023

(65) Prior Publication Data

US 2024/0068855 A1 Feb. 29, 2024

(30) Foreign Application Priority Data

Aug. 26, 2022 (EP) ..................................... 22192402

(51) Int. Cl.
| | |
|---|---|
| *G01F 15/06* | (2022.01) |
| *G01F 15/14* | (2006.01) |
| *G01F 15/18* | (2006.01) |

(52) U.S. Cl.
CPC ............ *G01F 15/068* (2013.01); *G01F 15/14* (2013.01); *G01F 15/185* (2013.01)

(58) Field of Classification Search
CPC ...... G01F 15/068; G01F 15/14; G01F 15/185; G01F 1/662; G01F 1/00; G01F 1/667; G01F 15/00
See application file for complete search history.

(56) References Cited

U.S. PATENT DOCUMENTS

| | | | | |
|---|---|---|---|---|
| 5,251,149 | A | * | 10/1993 | Williams .................. G01F 3/12 |
| | | | | 73/1.28 |
| 2019/0310116 | A1 | * | 10/2019 | Pilegaard ................ G01F 1/662 |
| 2020/0241156 | A1 | * | 7/2020 | Contant .................. G01V 1/189 |
| 2022/0136880 | A1 | * | 5/2022 | Pilegaard ................ G01F 1/662 |
| | | | | 73/861.28 |
| 2023/0012764 | A1 | * | 1/2023 | Holmegaard ........... G01F 15/18 |

FOREIGN PATENT DOCUMENTS

| | | |
|---|---|---|
| EP | 3550272 A1 | 10/2019 |
| EP | 3550272 B1 | 3/2021 |

* cited by examiner

*Primary Examiner* — Francis C Gray
(74) *Attorney, Agent, or Firm* — McGlew and Tuttle, P.C.

(57) ABSTRACT

A flow meter (1) includes a flow tube (3) and sensors (19a, 19b), that generate signals for measuring a fluid flow through the flow tube. An electronics housing (5) accommodates a battery (23) and a printed circuit board, PCB (15). The PCB is equipped with electronics. A pair of elongate connector elements (29) electrically connect axial end contacts (27) of the battery with the PCB for powering the electronics and/or sensors by the battery. The battery is arranged at a distance (D3) to the PCB. The pair of elongate connector elements includes a first end section (31), connected to the PCB, a contact section (33), connected to one of the end contacts of the battery, and a second end section (35). The electronics housing includes inward protrusions. The second end sections of the pair of elongate connector elements abut axially against the inward protrusions to fix the battery axially.

20 Claims, 8 Drawing Sheets

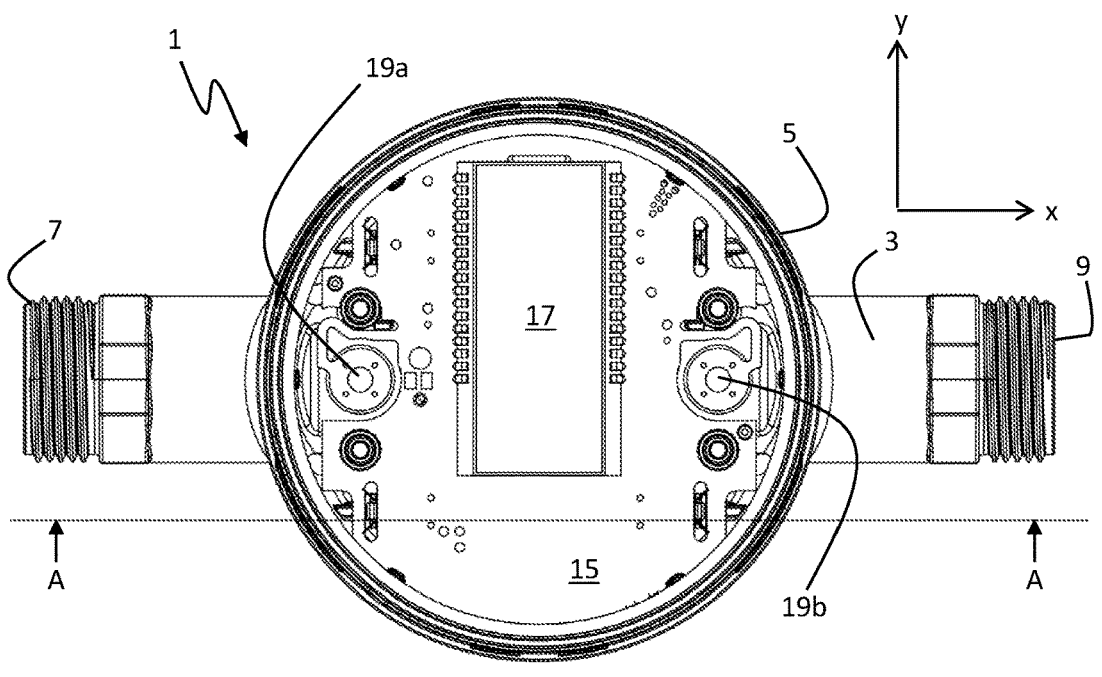
Fig. 2a
Section A-A:
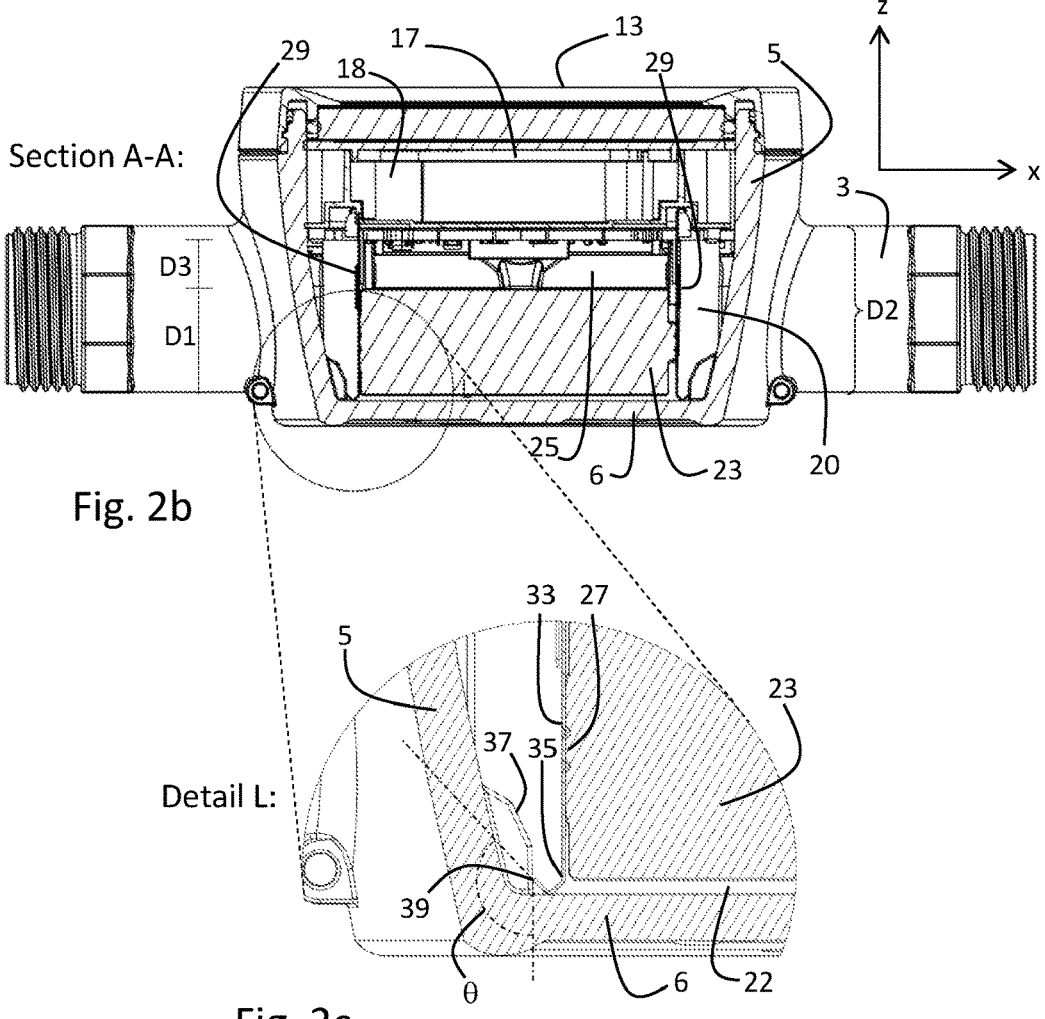
Fig. 2b
Detail L:
Fig. 2c

Detail M:

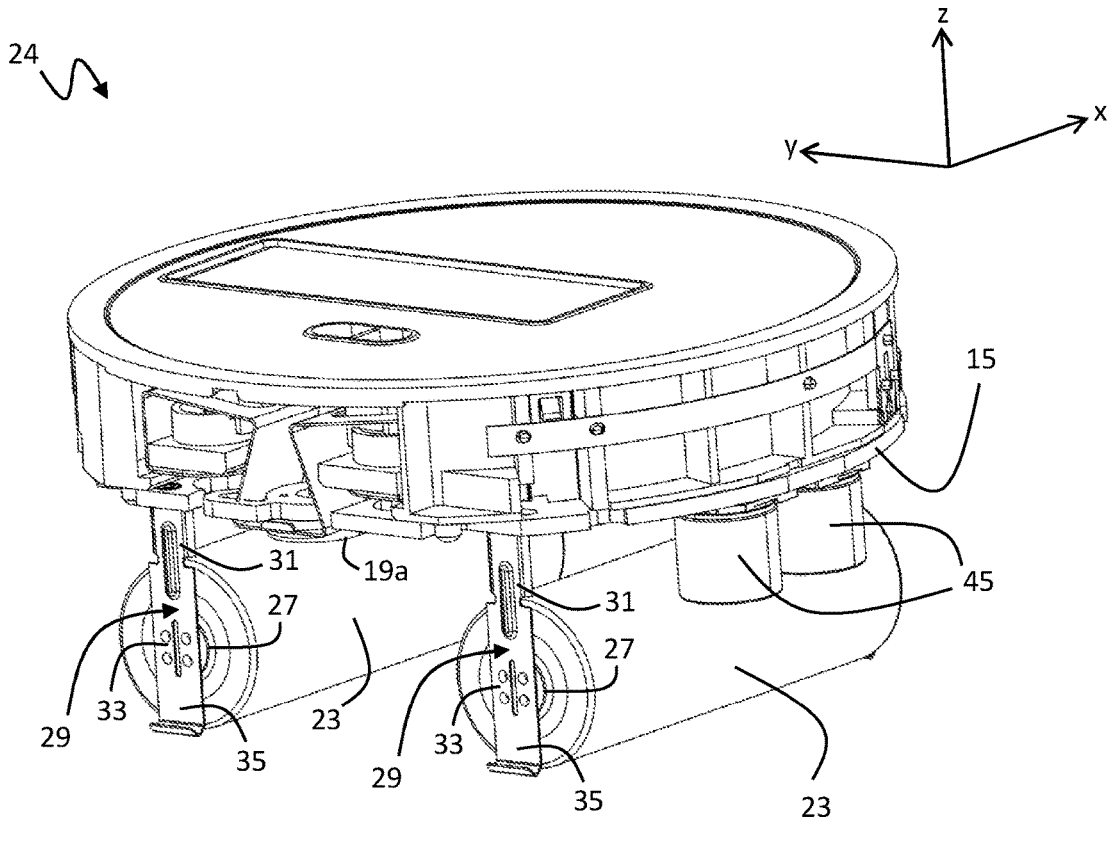
Fig. 6a
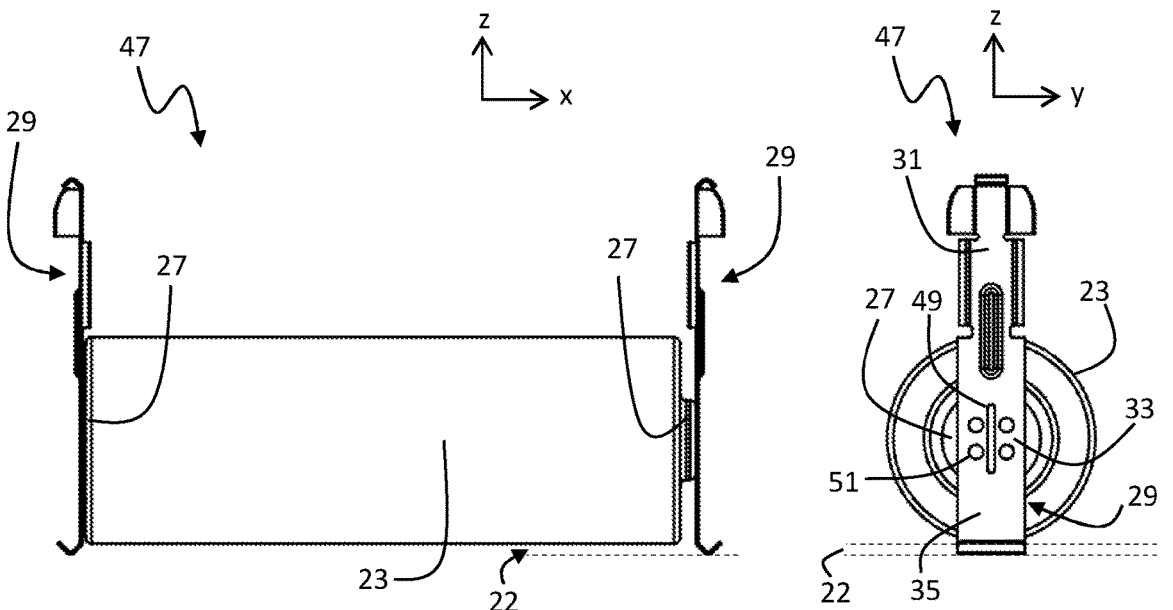
Fig. 6b
Fig. 6c

FLOW METER

CROSS REFERENCE TO RELATED APPLICATIONS

This application claims the benefit of priority under 35 U.S.C. § 119 of European Application 22192402.0, filed Aug. 26, 2022, the entire contents of which are incorporated herein by reference.

TECHNICAL FIELD

The present disclosure is directed to flow meters, in particular to battery-powered ultrasonic flow meters configured to measuring fluid flows and to automatically transmit wirelessly consumption values. The types of flow meters covered by this disclosure are ultrasonic flow meters, magnetic inductive flow meters, vortex flow meters, Coriolis mass flow meters, or other types of flow meters.

BACKGROUND

Every consumer of water, gas or thermal energy needs a flow meter for measuring a consumed amount to be billed accordingly by a utility provider. Flow meters are thus a mass product that must be produced in millions. A reduction of parts, material, and assembly costs is therefore a constant challenge to provide a flow meter that is able to compete on the market.

It is known from EP 3 550 272 B1 to install a PCB with meter electronics together with the batteries as a pre-assembled sub-assembly into a cup-shaped meter housing during an automated mass production process (EP 3 550 272 B1 is incorporated by reference).

SUMMARY

It is an object of the present invention to reduce the number of parts and material compared to the flow meter known from EP 3 550 272 B1.

The flow meter according to the present disclosure is designed to save the battery holder of the flow meter known from EP 3 550 272 B1.

According to a first aspect of the present disclosure, a flow meter is provided comprising:

a flow tube and sensors, wherein the sensors are configured and arranged to generate signals for measuring a fluid flow through the flow tube;

an electronics housing accommodating at least one battery and a printed circuit board, PCB, wherein the PCB is equipped with electronics; and at least one pair of elongate connector elements for electrically connecting axial end contacts of the at least one battery with the PCB for powering the electronics and/or sensors by the at least one battery, wherein the at least one battery is arranged at a distance to the PCB, wherein each of the pair of elongate connector elements comprises a first end section being connected to the PCB, a contact section being connected to one of the end contacts of the at least one battery, and a second end section, wherein the electronics housing comprises inward protrusions, wherein the second end sections of each pair of the at least one pair of elongate connector elements abut axially against the inward protrusions.

The battery holder of the flow meter known from EP 3 550 272 B1 serves as a bedding element for the battery to fix it relative to the PCB in the pre-assembled sub-assembly. It is thus a technical challenge to axially, laterally and vertically fix the batteries if no battery holder is used. As the flow meter is exposed to external vibrations, e.g. caused by pumps being connected to the same pipes that the flow meter is installed at, there is a general risk of loosening electric contacts if the battery has wiggle room. The elongate connector elements according to the present disclosure reduce the risk of loosening electric contacts. The elongate connector elements fix the battery in upward direction, i.e. towards the PCB, to keep the distance between the battery and the PCB, and preferably also in axial direction. In lateral direction, the battery may preferably be fixed by the electronics housing and/or the flow tube. Thereby, there is no need for a battery holder, which can thus be saved.

Optionally, the second end sections of each pair of the at least one pair of elongate connector elements are shaped away from each other towards the inward protrusions. Thereby, the second end sections have defined abutting surfaces facing the inward protrusions.

Optionally, the second end sections of each pair of the at least one pair of elongate connector elements are resiliently deformed and preloaded by axially abutting against the inward protrusions. The electric contact between the contact element and the battery is thus more resilient against vibrations. Furthermore, this may have a positive centering effect, so that the battery is axially centered between the inward protrusions.

Optionally, the electronics housing may comprise a housing bottom, wherein there is a vertical gap between the at least one battery and the housing bottom. This allows to arrange the at least one battery in a more stable position by wedging it between the flow tube and the electronics housing.

Furthermore, the vertical gap underneath the at least one battery may facilitate the assembly process. This is, because each of the at least one battery and each pair of elongate connector elements may be provided in the assembly process as a pre-assembled sub-unit. For example, a battery supplier may ship the batteries as pre-assembled sub-units comprising the pair of elongate connector elements already welded or brazed to the batteries. Preferably, the second end sections of the pair of elongate connector elements may project beyond an outer perimeter of the battery, so that the pre-assembled sub-unit is able to stand on the second end sections of the pair of elongate connector elements. In other words, the preferably cylindrical battery does not roll away when it lies on its lateral surface, because the second end sections of the pair of elongate connector elements define feet that the battery can stand on. This facilitates an automatic assembly of the flow meter by using a robot, wherein the robot grabs the pre-assembled sub-unit and attaches it to the PCB.

Optionally, there may be an empty volume portion between the at least one battery and the PCB. In EP 3 550 272 B1, the volume between the at least one battery and the PCB is filled with the battery holder. As the battery holder is not needed anymore according to the present disclosure, the volume portion between the at least one battery and the PCB is preferably empty, which reduces the weight and the diversity of parts.

Optionally, components of the electronics on the PCB may project from the PCB into a room between the at least one battery and the PCB. This is particularly beneficial, because it allows a more compact configuration of the flow meter. In EP 3 550 272 B1, the room between the at least one battery and the PCB was filled with the battery holder. Thus, bulky electronic components, such as capacitors or inductances, had to be arranged elsewhere, or they had to be arranged on the PCB side facing away from the battery. As the battery holder is not needed anymore according to the present disclosure, the volume between the at least one battery and the PCB may at least partly be used for electronic components projecting from the PCB into the room between the at least one battery and the PCB.

Optionally, the at least one battery may be held at the distance to the PCB by the at least one pair of elongate connector elements alone. In EP 3 550 272 B1, the battery pins pull the batteries towards the PCB against the battery holder. In contrast to that, the elongate connector elements keep the at least one battery at the distance to the PCB. Preferably, the at least one battery is pushed downwards onto the housing bottom by the elongate connector elements.

Optionally, the at least one battery is wedged between the flow tube and the electronics housing. The flow tube may provide a laterally outward-downward sloped surface on which one lateral side of the at least one battery can rest. The other lateral side of the at least one battery may rest on a laterally inward-downward sloped surface of the electronics housing. Such a laterally inward-downward sloped surface may be provided with or by means of recesses that each receive a rim of the cylindrical battery.

Optionally, the electronics housing may define a lower volume below the PCB, wherein the lower volume tapers in downward direction. This saves housing material and facilitates the wedging of the at least one battery between the flow tube and the electronics housing.

Optionally, the electronics housing comprises at least one recess receiving a rim of the at least one battery for fixing the at least one battery in lateral direction and/or axial direction and/or downward direction. The recesses may keep the battery laterally in place against laterally outward, axial and/or downward displacement. The battery preferably does not touch a housing bottom of the electronics housing.

Optionally, the electronics housing may accommodate at least two batteries extending in parallel to each other and in parallel to the flow tube, wherein the flow tube extends between the at least two batteries. The batteries on either side of the flow tube may thus be efficiently placed in the lower volume of the electronics housing below the PCB and next to the flow tube.

Optionally, the at least one battery may have an essentially cylindrical shape defining a battery diameter, wherein the sensors are arranged at a sensor wall of the flow tube, wherein the sensor wall is distanced from a housing bottom of the electronics housing by more than the battery diameter. The flow tube may thus have a relatively large diameter without the need for a large electronics housing.

Optionally, the sensor wall may comprise at least one flat sensor surface on which the sensors reside, wherein the at least one flat sensor surface extends in parallel to the housing bottom. This allows to arrange the sensors on the PCB extending in parallel to the sensor surface and the housing bottom.

Optionally, the sensors may be arranged on the PCB and/or essentially in the same plane as the electronics on the PCB. Thereby, the sensors may be attached to the sensor surface during assembly of the flow meter by inserting the PCB with the electronics and the at least one battery as a pre-assembled unit into the electronics housing. There is no separate step needed for installing the sensors.

Optionally, the flow tube may extend at least partially through the electronics housing and/or forms a part of the electronics housing. Most preferably, the flow tube may extend completely with its full diameter through the electronics housing. This allows for a compact configuration of the flow sensor.

Optionally, the second end sections of each pair of the at least one pair of elongate connector elements may be bent and/or folded away from the at least one battery towards the inward protrusions. Thereby, the second end sections have a spring effect, so that the battery is axially centered within the electronics housing.

Optionally, the contact section of each elongate connector element may be arranged between the first end section of the elongate connector element and the second end section of the elongate connector element. As the elongate connector element extends essentially vertical within the electronics housing, it is to be understood that the contact section of each elongate connector element may be arranged vertically between the first end section of the elongate connector element and the second end section of the elongate connector element. The second end section of the elongate connector element may even touch or almost touch the housing bottom.

Optionally, the contact section of each elongate connector element may be welded or brazed to one of the end contacts of the at least one battery. Preferably, two elongate connector elements being welded or brazed to the end contacts of one battery forms a pre-assembled sub-unit, wherein the first end section of the elongate connector elements are clicked into corresponding reception holes of the PCB in order to assemble the PCB with the at least one battery as a pre-assembled unit. The reception holes of the PCB may be plated, so that they provide for both an electric contact and a mechanical fixation of the elongate connector elements to the PCB.

Optionally, each of the elongate connector elements may be form-stiffened at the first end section and/or the second end section and/or the contact section. This is beneficial as the connector elements not only have the function to provide an electric contact, but also a function to structurally fix the at least one battery to the PCB. In particular, as long as the PCB with the at least one battery as a pre-assembled unit is not yet installed in the electronics housing, a form-stiffened elongate connector element is advantageous.

Optionally, each of the elongate connector elements may be a press-formed metal strip, wherein the section second end section of the elongate connector element is bent and/or folded once or more times and in sum by a total angle of 90° or more. This is beneficial to facilitate the assembly of the PCB with the at least one battery as a pre-assembled unit, when the pre-assembled unit is pushed downwards into the electronics housing. The second end section of the elongate connector element may thus have a barb function with a hook effect. It may comprise a cutting edge facing inclined upward, so that it cuts at least slightly into the material of the electronics housing, which preferably comprises a polymer and/or a composite material.

Optionally, the second end sections of each pair of the pair of elongate connector elements may be resiliently deformed towards the at least one battery when squeezed into the inward protrusions during assembly of the flow meter. Thereby, the elongate connector elements have a spring function to maintain electric contacts upon vibrations or other structural stress.

Optionally, each of the at least one battery and each pair of elongate connector elements may be arranged as a pre-assembled sub-unit, wherein the contact sections of the pair of elongate connector elements is welded or brazed to the end contacts of the battery, wherein the second end sections of the pair of elongate connector elements project beyond an outer perimeter of the battery, so that the pre-assembled sub-unit is able to stand on the second end sections of the pair of elongate connector elements. This facilitates for a robot to grab the pre-assembled sub-unit during automatic assembly of the flow meter.

Optionally, the flow meter may be an ultrasonic flow meter, wherein the sensors are ultrasonic transducers.

An embodiment of the present disclosure will now be described by way of an example with reference to the following figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2a is a top view of the embodiment shown in FIG. 1;

FIG. 2b is a longitudinal cut view along the section A-A of the embodiment shown in FIG. 2a;

FIG. 2c is a detail view of the embodiment shown in FIG. 2b;

FIG. 3a is a top view of the embodiment shown in FIG. 1;

FIG. 3b is a detail view of the embodiment shown in FIG. 3a;

FIG. 4b is a cross-sectional cut view along the section B-B of the embodiment shown in FIG. 4a;

FIG. 6a is a perspective view of a pre-assembled unit with the PCB and two batteries according to the embodiment shown in FIG. 1;

FIG. 6b is a longitudinal side view of a pre-assembled sub-unit of a battery with two elongate contact elements according to the embodiment shown in FIG. 1;

FIG. 6c is an axial front view of the pre-assembled sub-unit shown in FIG. 6b;

FIG. 7b is a longitudinal side view of an elongate contact element shown in FIG. 7a;

FIG. 8a is a perspective view of a second embodiment of an elongate contact element; and FIG. 8b is a longitudinal cut view of an elongate contact element shown in FIG. 8a.

DESCRIPTION OF PREFERRED
EMBODIMENTS

Figure 1:
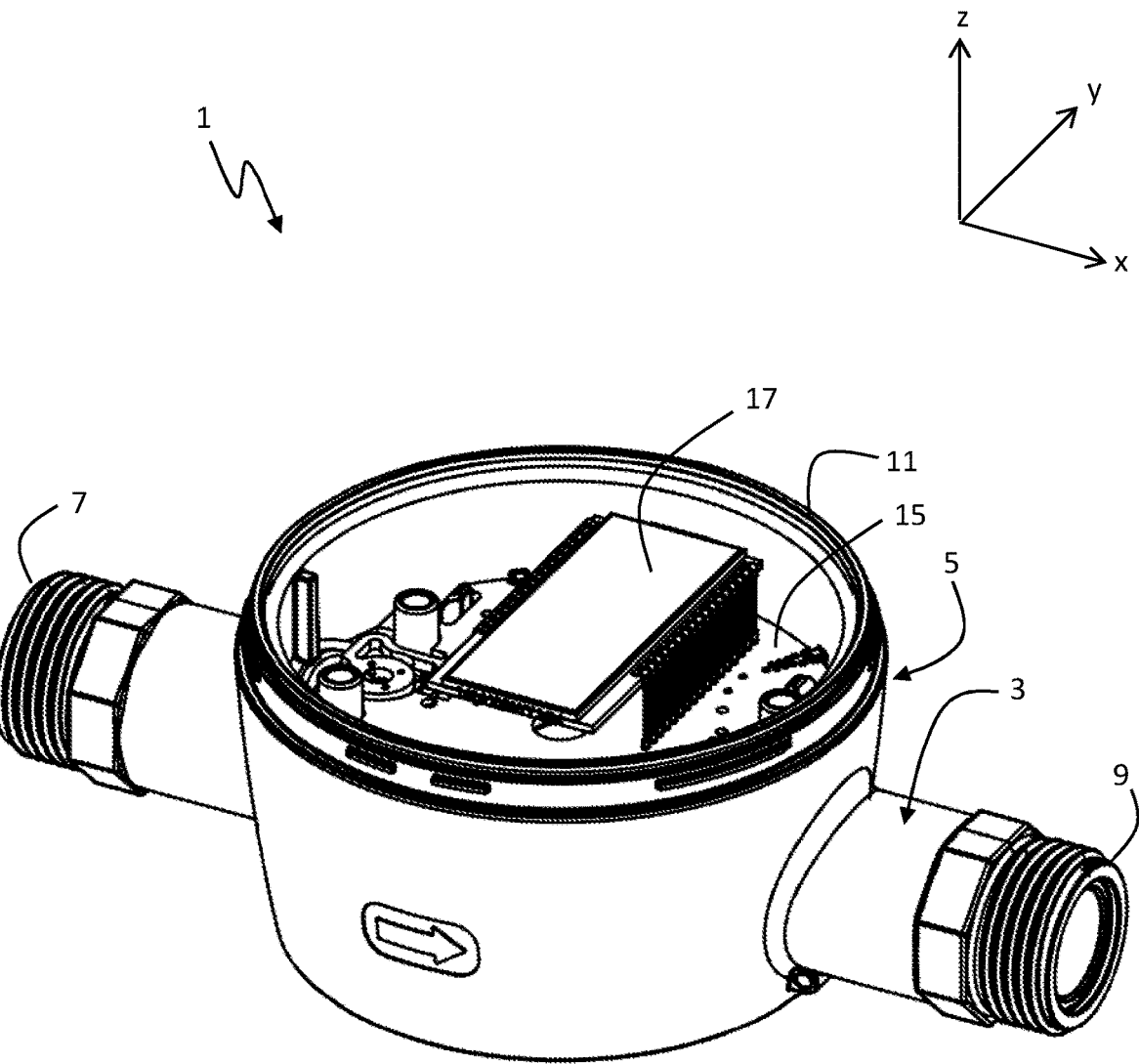
FIG. 1 is a first perspective view of an example of an embodiment of the flow meter disclosed herein without a lid.

Referring to the drawings, FIG. 1 shows a flow meter 1 according to the present disclosure without a lid. In order to better understand the spatial arrangements of the components of the flow meter 1, the figures show a local right-handed Cartesian coordinate system, wherein the x-axis is defined as a longitudinal horizontal axis, the y-axis is lateral horizontal axis and the z-axis is directed vertically upward. It should be noted that the flow meter 1 can be installed and arranged in any desired spatial orientation. So, spatial terms like "vertical", "upper", lower", "upward", or "downward" shall refer to the z-axis. Analogously, spatial terms like "axially", "forward", "backward", "front", "back", "rear" shall refer to the x-axis. Analogously, spatial terms like "lateral" shall refer to the y-axis.

The flow meter 1 comprises a straight flow tube 3 that extends in x-direction through an electronics housing 5. The flow tube 3 is laterally centered within the electronics housing 5 and extends axially along a housing bottom 6 (shown in FIG. 2b) through the electronics housing 5. The flow tube 3 and the electronics housing 5 are in fact integrally moulded as a single piece of composite polymer material. The flow tube 3 comprises an inlet 7 and an outlet 9, wherein both the inlet 7 and the outlet 9 comprise outer threads for being sealingly connected to a fluid pipe by a union nut (not shown). The electronics housing 5 has a cup-like and slightly downward tapering shape that is open to an upper side 11 which can be closed by fixing a lid 13 (shown in FIG. 4a, 4b) onto it. The electronics housing 5 accommodates electronics on a printed circuit board, PCB 15. As part of the electronics, the PCB 15 is equipped on its upper side with a display 17, here in form of an LCD display 17 facing upward, so that it is visible through a transparent window in the lid 13. The PCB 15 extends essentially horizontal in the xy-plane above or on the flow tube 3. The PCB 15 has a cross-sectional shape that fits into the essentially circular cross-sectional shape of the electronics housing 5. Thereby, the PCB 15 defines a separating horizontal plane between an upper volume 18 (shown in FIG. 2b) of the electronics housing 5 and a lower volume 20 (shown in FIG. 2b) of the electronics housing 5.

The top view of FIG. 2a shows that there are sensors 19a, 19b arranged on the PCB 15, wherein the sensors 19a, 19b are configured and arranged to generate signals for measuring a fluid flow through the flow tube 3. The sensors 19a, 19b are ultrasonic transducers that rest on an upward facing flat outer surface 21 of the flow tube 3, wherein a first one of the sensors 19a is located more backward than a second one of the sensors 19b. The surface 21 may thus be denoted as sensor surface 21 of the flow tube 3. The sensors 19a, 19b send and receive ultrasonic waves through the wall of the flow tube 3. The ultrasonic waves are sent by one of the sensors 19a, 19b, reflected to travel through the fluid flowing in the flow tube 3 and reflected again to be received by the other one of the sensors 19b,a. Differences in run-time between ultrasonic waves travelling in flow direction (positive x-direction) and against flow direction (negative x-direction) may be used to calculate a velocity of the fluid flow in the flow tube 3. As the cross-sectional area of the flow tube 3 in the axial section between the sensors 19a, 19b is a known fixed constant value, the electronics on the PCB 15 is able to determine a fluid flow through the flow tube 3 based on the signals generated by the sensors 19a, 19b.

FIG. 2b shows a longitudinal cut view along section A-A of FIG. 2a. Underneath the PCB 15, there is a pair of batteries 23 located in the lower volume 20 (shown in FIG. 2b) of the electronics housing 5. The batteries 23 are identical and have an essentially cylindrical shape and extend axially in x-direction in parallel to the flow tube 3. There is small vertical gap 22 between the batteries 23 and the housing bottom 6. So, the batteries 23 do not touch the housing bottom 6. The outer battery diameter D1 is smaller than the outer diameter D2 of the flow tube 3. Thereby, the distance of the sensor surface 21 of the flow tube 3 from the housing bottom 6 is larger than the battery diameter D1. Thus, there is a vertical distance D3 between the batteries 23 and the PCB 15, which creates an empty volume portion 25 of the lower volume 20 between the batteries 23 and the PCB 15. Components of the electronics on the PCB 15 may, however, project from the PCB 15 into the empty volume portion 25. The lower volume 20 slightly tapers in downward direction. Thus, the housing bottom 6 has a smaller horizontal cross-sectional area than the lid 13.

The batteries 23 power the electronics on the PCB 15 and the sensors 19a, 19b. Each of the batteries 23 comprises axial end contacts 27 at their axial front and rear ends. The flow meter 1 comprises for each battery a pair of elongate connector elements 29 for electrically connecting the axial end contacts 27 of each battery 23 with the PCB 15 for powering the electronics and the sensors 19a, 19b. The four elongate connector elements 29 are essentially identical press-formed metal strips extending essentially vertically through the lower volume 20 of the electronics housing 5. The connector element 29 comprises an upper first end section 31 being connected to the PCB 15, a contact section 33 being brazed or welded to an end contact 27 of the battery 23 and a lower second end section 35. The lower second end section 35 extends from the contact section 33 downwards towards the housing bottom 6. The second end sections of each pair of the at least one pair of elongate connector elements 29 are shaped opposite to each other and abut against the electronics housing 5. The electronics housing 5 comprises inward protrusions 37 against which the second end sections 35 of the elongate connector elements 29 abut. This is shown more clearly in detail FIG. 2c.

As can be seen in detail FIG. 2c, the second end section 25 of the elongate connector element 29 is bent or folded away twice from the battery 23 in sum by a total angle of 90° or more. Thereby, the second end sections 29 have a centering spring effect, so that the battery 23 is axially centered between the corresponding inward protrusions 37 within the electronics housing 5. Furthermore, assembly of the PCB 15 with the pair of batteries 23 as a pre-assembled unit 24 (shown in FIG. 6a) into the electronics housing 5 is facilitated, when the pre-assembled unit 24 is pushed downwards into the electronics housing 5. The second end section 35 of the elongate connector element 29 has thus a barb function with a hook effect. It comprises a cutting edge 39 facing inclined upward, so that it cuts at least slightly into the material of the inward protrusion 37, which preferably comprises a polymer and/or a composite material. FIG. 2c shows the vertical gap 22 between the battery 23 and the housing bottom 6. The gap 22 may be due to the batteries 23 being wedged between the flow tube 3 and the electronics housing 5 (see FIG. 4b). Alternatively, or in addition as shown in FIG. 2c, the second end sections 25 of the elongate connector element 29 may project beyond the battery perimeter by the size of the gap 22, so that the second end sections 25 define feet that stand on the housing bottom 6.

Figures 3A, 3B:
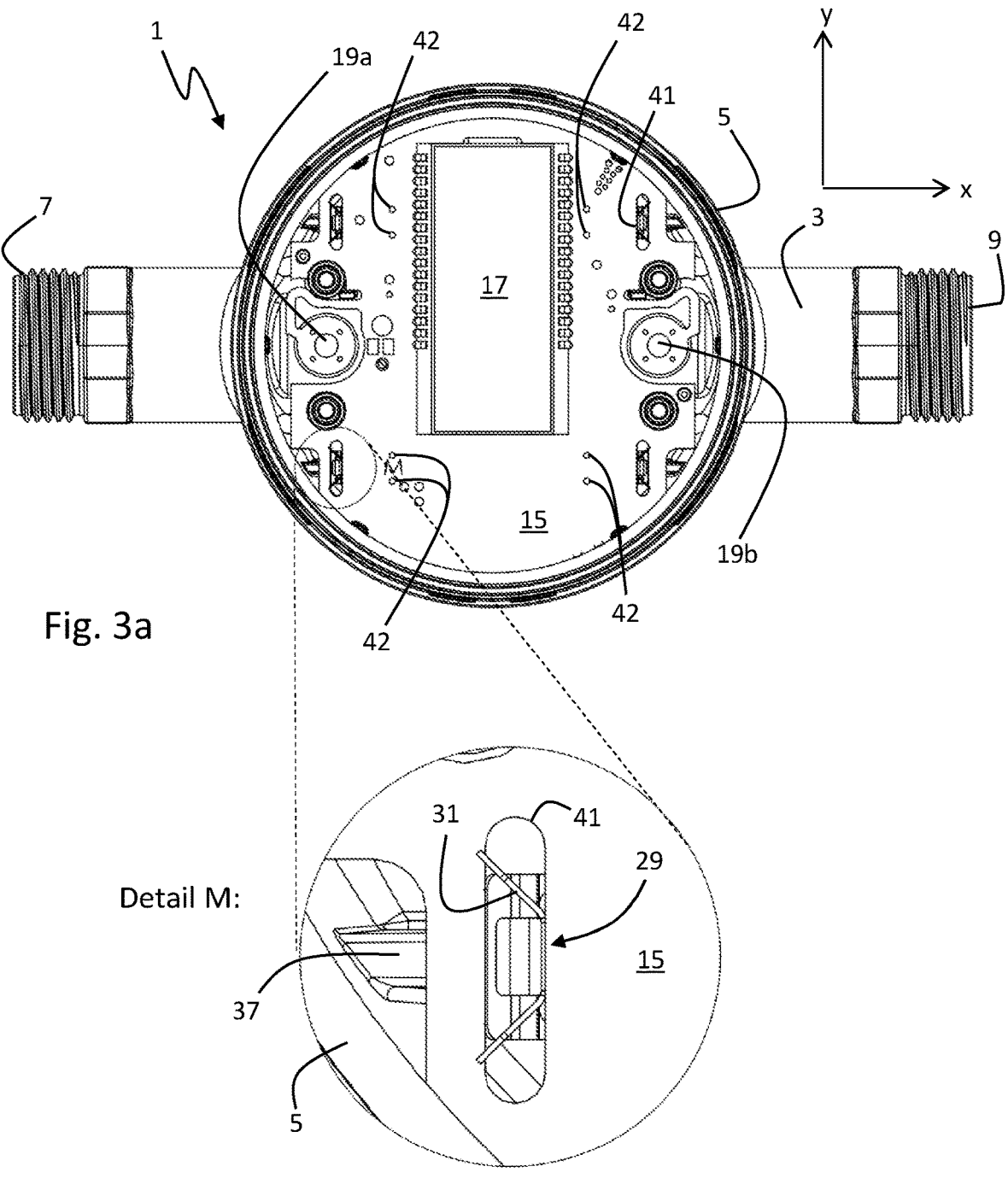

FIGS. 3a, 3b show how the upper first end section 31 of the elongate connector element 29 is connected to the PCB 15. The PCB 15 comprises slot-shaped plated reception holes 41 through which the upper first end section 31 of the elongate connector element 29 project into the upper volume 18 above the PCB 15. Thereby, an electric contact and a mechanical fixation of the elongate connector elements 29 to the PCB 15 is provided. The upper first end section 31 of the elongate connector element 29 is shaped to safely hook into the reception holes 41 of the PCB 15 as shown in FIG. 3b.

In the assembly process of the flow meter 1, each battery 23 comes as a pre-assembled sub-unit 47 having the pair of connector elements 29 welded or brazed to it. The pre-assembled sub-unit 47 may be inserted upward from below into the reception holes 41 of the PCB 15. The upper first end section 31 of the elongate connector element 29 then snaps in to safely hook into the reception holes 41 of the PCB 15.

Figures 8A, 8B:
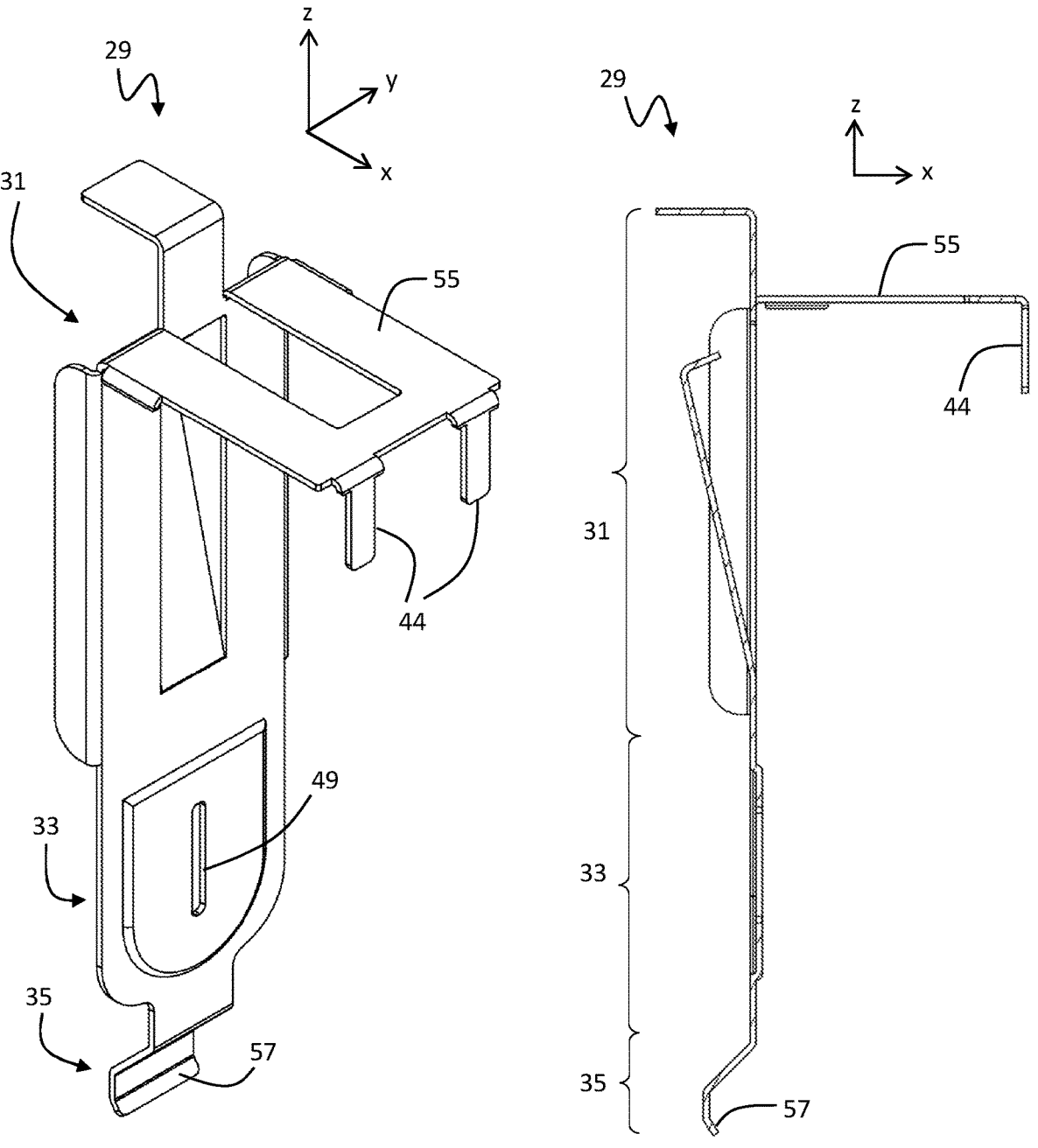

An alternative embodiment of the connector elements 29 as shown in FIGS. 8a,b may be attached in a different way to the PCB 15. The PCB 15 comprises two connector holes 42 for each connector element 29, i.e. in total eight connector holes 42. The embodiment of the connector elements 29 according to FIGS. 8a, 8b comprises connector pins 44 to be inserted into the connector holes 42, so that the connector elements 29 can be welded or brazed to the PCB 15. In that embodiment, the connector elements 29 are inserted downward from the top of the PCB 15 through the reception holes 41 and then welded or brazed to the PCB 15. The PCB 15, the batteries 23 and the connector elements 29 form a pre-assembled unit 24, wherein the connector elements 29 of FIGS. 8a, 8b are inserted and brazed to the PCB 15 in a first step, and then the batteries 23 are welded or brazed to the connector elements 29 in a second step. Finally, the pre-assembled unit 24 is inserted into the electronics housing 5.

Figure 4A:
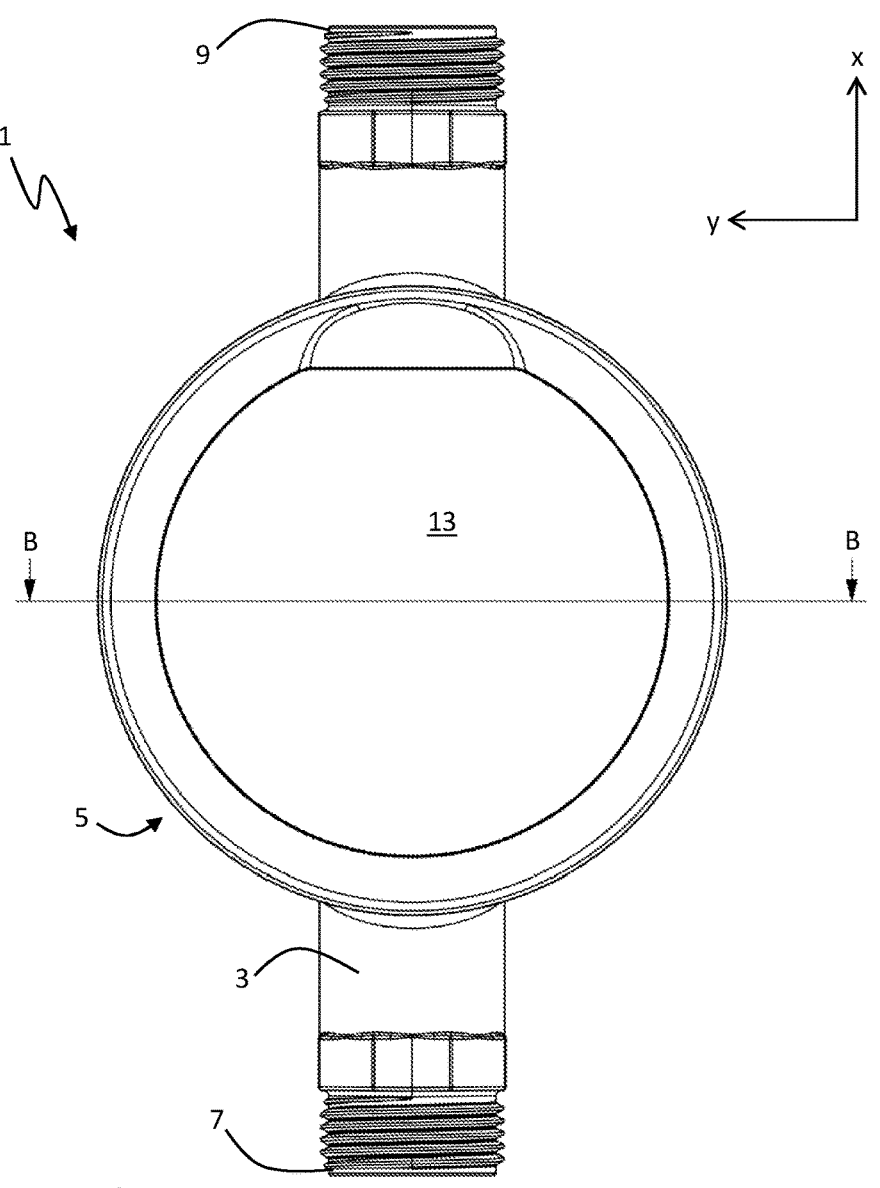
FIG. 4a is a top view of the embodiment shown in FIG. 1 with a lid.
Figure 4B:
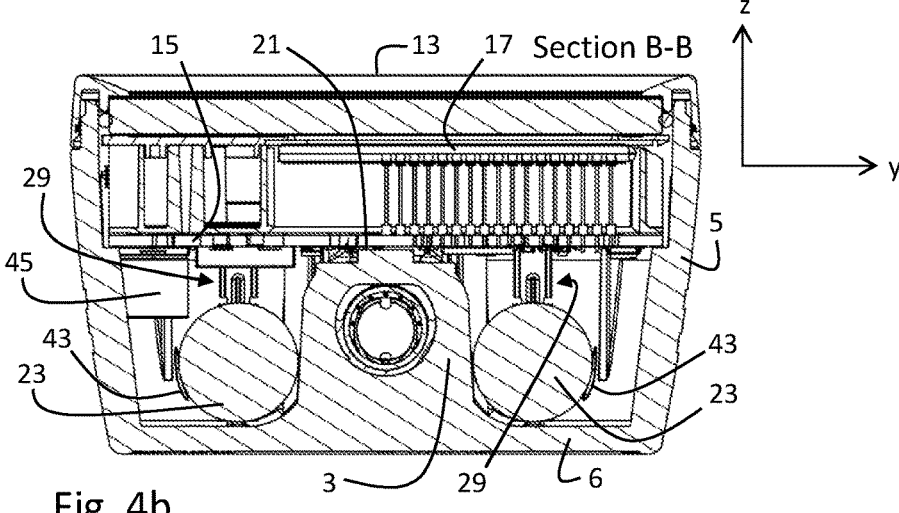

FIG. 4a shows a top view of the flow meter 1 with a lid 13. The lid 13 is at least partly transparent to allow reading the display 17 underneath. The cross-sectional view of FIG. 4b shows that the batteries 23 are arranged on either lateral side of the flow tube 3, wherein the batteries 23 rest laterally inward against the flow tube 3. In order to keep the batteries 23 in place against laterally outward displacement, the electronics housing 5 comprises recesses 43 in form of grooves in the inner surface of the electronics housing 5, wherein rims of the cylindrical batteries 23 are laterally bedded in the recesses 43. The batteries 23 are in fact wedged between the flow tube 3 and the recesses 43, so that they do not touch the housing bottom 6. As can be seen in FIG. 4b, the flow tube 3 defines a laterally outward-downward sloped surface on which one lateral side of the at least one battery 23 rests. The other lateral side of the at least one battery 23 rest in the recesses 43 that form a laterally inward-downward sloped surface of the electronics housing 5. The downward tapering of the lower volume 20 supports the wedging effect. The recesses 43 fix the batteries 23 in lateral outward direction, in downward direction and in axial direction. In upward direction, the pair of connector elements 29 keep the respective battery 23 in place.

Figure 5:
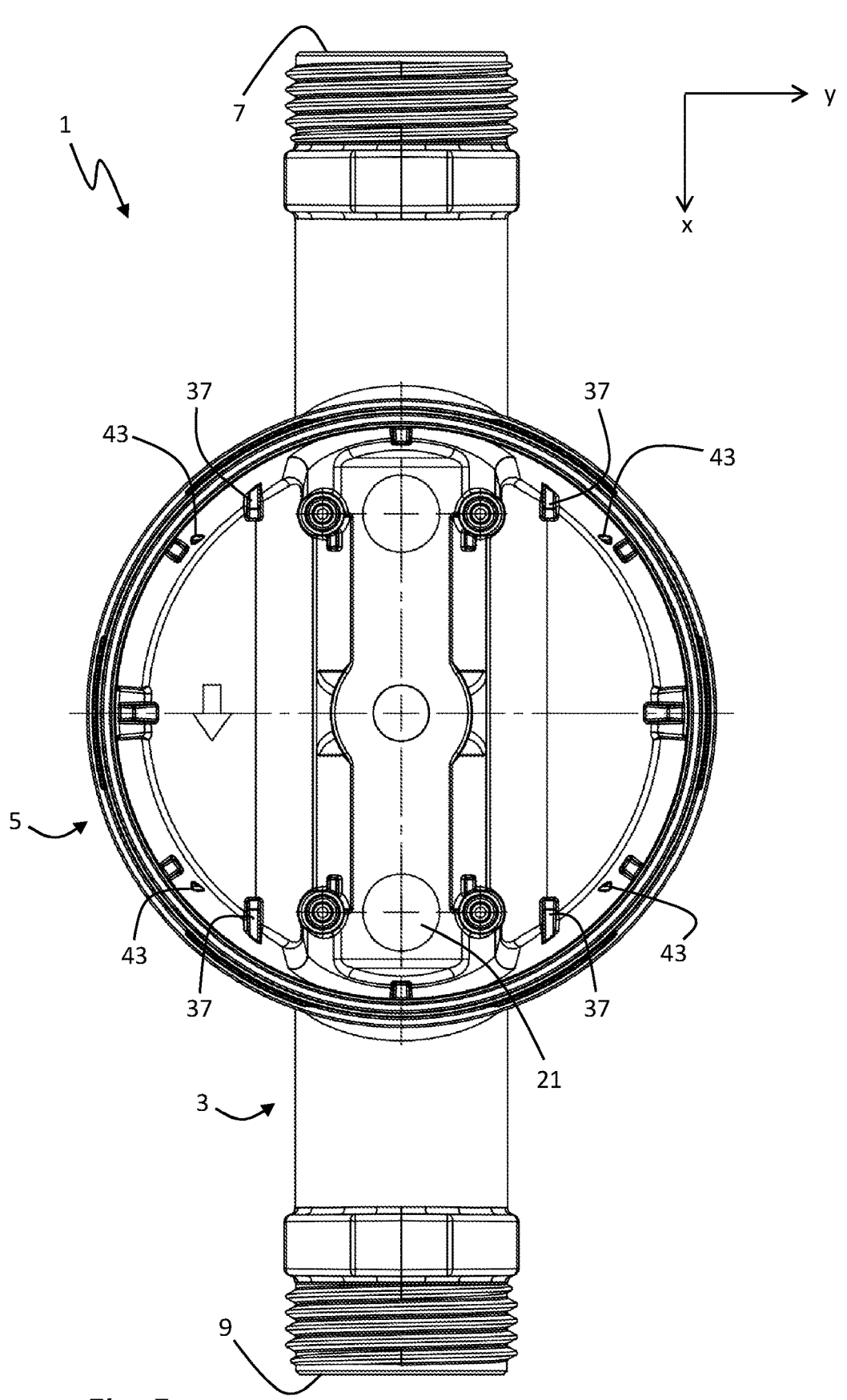
FIG. 5 is a top view of the electronic housing alone according to the embodiment shown in FIG. 1.

FIG. 5 shows the empty electronics housing 5 and the flow tube 3 before the pre-assembled unit 24, i.e. the PCB 15 with the pair of batteries 23 connected by the connector elements 29, is installed. The inward protrusions 37 and the recesses 43 for lateral outward, downward and axial battery fixation are clearly visible. There are two recesses 43 for each battery 23 to laterally bed the forward battery rim and the rear battery rim, respectively.

FIG. 6a shows the pre-assembled unit 24, i.e. the PCB 15 with the pair of batteries 23 connected by the connector elements 29, before it is installed into the empty electronics housing 5 as shown in FIG. 5. It is clearly visible that the batteries 23 are fixed to the PCB 15 by nothing else than the elongate connector elements 29. There is no battery holder placed between the battery 23 and the PCB 15. Bulky electric components 45, e.g. capacitors, project at least partly in the empty volume portion 25 between the battery 23 and the PCB 15. This can also be seen in FIG. 4b. A large part of the electronics and the sensors 19a, 19b are placed on the bottom side of the PCB 15.

FIG. 6b,c show a pre-assembled sub-unit 47 comprising one battery 23 together with a pair of parallel elongate connector elements 29. The contact section 33 of each connector element 29 is brazed or welded to the one of the end contacts 27 of the battery 23. The pair of parallel elongate connector elements 29 face away from each other in axial direction, i.e. in x-direction. This means that their arrangement is essentially mirror-symmetric with respect to a virtual yz-plane through an axial center of the battery 23. As shown in FIGS. 6b, 6c, the second end sections 35 of the pair of elongate connector elements 29 project beyond an outer perimeter of the battery 23, so that the pre-assembled sub-unit 47 is able to stand on the second end sections 35 of the pair of elongate connector elements 29. During auto-mated assembly of the flow meter 1, it is thereby easier for a robot to pick up the pre-assembled sub-unit 47 having a well-defined spatial orientation. It is preferred but not nec-essary that the gap 22 shown in FIGS. 6a, 6b is the same as in FIGS. 2b, 2c. The second end sections 35 of the pair of elongate connector elements 29 do not need to touch the housing bottom 6 as shown in FIGS. 2b, 2c, i.e. the connector elements 29 may project beyond the outer perim-eter of the battery 23 by less than the gap 22 between the battery 23 and the housing bottom 6.

Figure 7A:
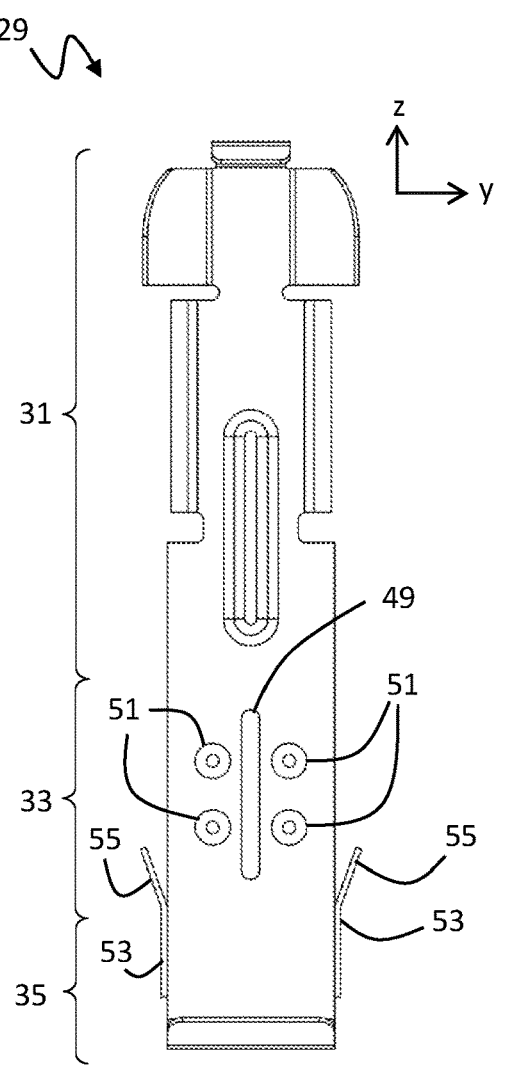
FIG. 7a is an axial front view of a first embodiment of an elongate contact element according to the embodiment shown in FIG. 1.
Figure 7B:
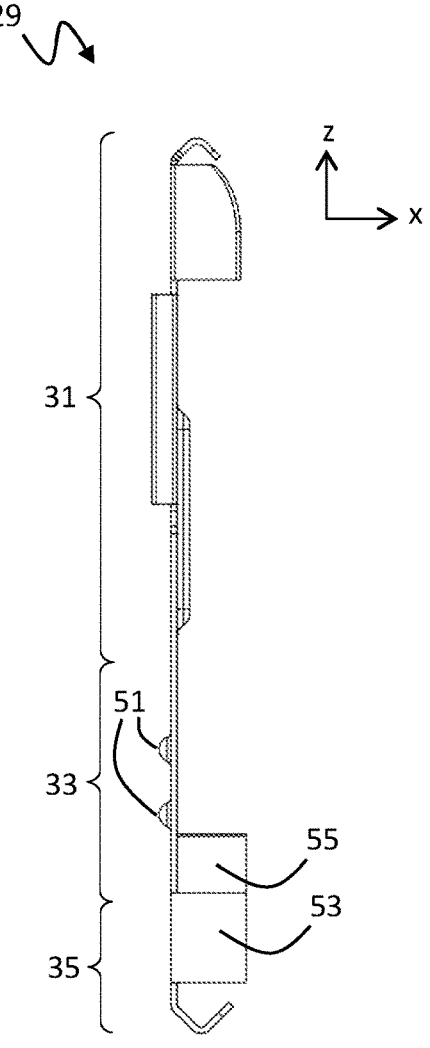
Figure 7C:
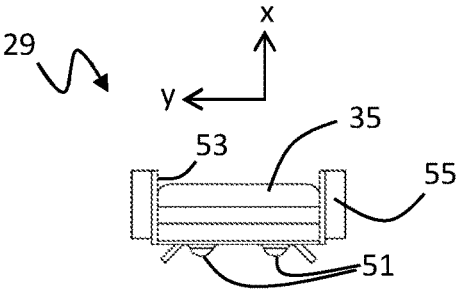
FIG. 7c is a bottom view of an elongate contact element shown in FIGS. 7a and 7b.

FIGS. 7a-c show the elongate connector element 29 separately in more detail. It is a press-formed metal strip that is form-stiffened at the upper first end section 31 of the elongate connector element 29. The contact section 33 of the elongate connector element 29 comprises a slot 49 and contact dots 51 for providing structural grip for the welded or brazed connection with the battery 23. The lower second end section 35 of the elongate connector element 29 is bent or folded to form an axially outward facing hook for abutting against the inward protrusion 37 of the electronics housing 5 for keeping the battery 23 in place against axial displace-ment. The second end section 35 of the connector element 29 further comprises lateral flanks 53. The inward protrusions 37 of the electronics housing 5 fit between the lateral flanks 53 to stabilise the connector element 29 in lateral direction. An upper part 55 of the lateral flanks 53 is bent laterally outward as can be seen in FIGS. 7a-c. These upper parts 55 of the lateral flanks 53 are resiliently squeezed laterally inward when the pre-assembled unit 24 is inserted into the empty electronics housing 5 as shown in FIG. 5.

FIGS. 8a, 8b show an alternative embodiment of the connector element 29. Similar to the embodiment of FIG. 7a-c, the connector element 29 of FIG. 8a, 8b has a connection section 33 between an upper first end section 31 and a lower second end section 35. The connector element 29, however, is not inserted into the PCB 15 as a pre-assembled sub-unit together with the batteries 23. The connector elements 29 are separately inserted downward from the top side of the PCB 15 into the reception holes 41 as shown in FIG. 3a. The first end section 31 of the connector element 29 comprises an axial bridge section 55 that leads to downward projecting connector pins 44. The connector pins 44 fit into connector holes 42 as shown in FIG. 3a. Once the connector element 29 is inserted in the reception holes 41 with the pins 44 inserted in connector holes 42, the connector element 29 is glued, welded or brazed to the PCB 15. The batteries 23 may then be welded or brazed to the contact sections 33 of the connector ele-ments 29. This would result in a pre-assembled unit 24 similar to FIG. 6a. Alternatively, the batteries 23 may not be welded or brazed to the contact sections 33 of the connector elements 29. The batteries 23 may be placed separately into the empty electronics housing 5 as shown in FIG. 5 during assembly. The PCB 15 with the attached connector elements 29 may then be pushed downwards into the electronics housing 5 so that the contact sections 33 of the connector elements 29 contact the axial end contacts 27 of the batteries 23. In order to facilitate the assembly process, an end tip 57 of the second end section 35 is bent or folded axially inward. As in the embodiment of FIG. 7a-c, the second end section 35 abuts against the inward protrusions 37 of the electronics housing 5 and is thereby deformed resiliently and preloaded. The contact element 29 thus provides a preloaded spring force that is directed axially inward and urges the contact sections 33 of the connector elements 29 against the axial end contacts 27 of the batteries 23. This reduces the risk of loosening electric contact when the flow meter 1 is exposed to vibrations or other structural stress.

Where, in the foregoing description, integers or elements are mentioned which have known, obvious or foreseeable equivalents, then such equivalents are herein incorporated as if individually set forth. Reference should be made to the claims for determining the true scope of the present disclo-sure, which should be construed so as to encompass any such equivalents. It will also be appreciated by the reader that integers or features of the disclosure that are described as optional, preferable, advantageous, convenient or the like are optional and do not limit the scope of the independent claims.

The above embodiments are to be understood as illustra-tive examples of the disclosure. It is to be understood that any feature described in relation to any one embodiment may be used alone, or in combination with other features described, and may also be used in combination with one or more features of any other of the embodiments, or any combination of any other of the embodiments. While at least one exemplary embodiment has been shown and described, it should be understood that other modifications, substitu-tions and alternatives are apparent to one of ordinary skill in the art and may be changed without departing from the scope of the subject matter described herein, and this application is intended to cover any adaptations or variations of the specific embodiments discussed herein.

In addition, "comprising" does not exclude other elements or steps, and "a" or "one" does not exclude a plural number. Furthermore, characteristics or steps which have been described with reference to one of the above exemplary embodiments may also be used in combination with other characteristics or steps of other exemplary embodiments described above. Method steps may be applied in any order or in parallel or may constitute a part or a more detailed version of another method step. It should be understood that there should be embodied within the scope of the patent warranted hereon all such modifications as reasonably and properly come within the scope of the contribution to the art. Such modifications, substitutions and alternatives can be made without departing from the spirit and scope of the disclosure, which should be determined from the appended claims and their legal equivalents.

While specific embodiments of the invention have been shown and described in detail to illustrate the application of the principles of the invention, it will be understood that the invention may be embodied otherwise without departing from such principles.

LIST OF REFERENCE CHARACTERS 1 flow meter
3 flow tube 5 electronics housing
6 housing bottom
7 inlet
9 outlet
11 open upper side of the electronics housing
13 lid
15 PCB
17 display
18 upper volume of electronics housing
19a, 19b sensors
20 lower volume of electronics housing
21 sensor surface of the flow tube
22 gap
23 batteries
24 pre-assembled unit
volume portion
27 axial end contacts of the battery
29 elongate connector elements
31 first end section of elongate connector element
33 contact section of elongate connector element
35 second end section of elongate connector element
37 inward protrusions
39 cutting edge
41 reception holes of PCB
42 connector holes of PCB
43 recesses
44 connector pins
45 components of the electronics
47 pre-assembled sub-unit
49 slot
51 contact dots
53 lateral flanks
55 bridge section
57 end tip
D1 outer diameter of battery
D2 outer diameter of flow tube
D3 distance between PCB and battery
θ angle

What is claimed is:

1. A flow meter comprising:
a flow tube;
sensors, wherein the sensors are configured and arranged to generate signals for measuring a fluid flow through the flow tube;
an electronics housing configured to accommodate at least one battery and a printed circuit board (PCB), wherein the PCB is equipped with electronics; and
at least a pair of elongate connector elements configured to electrically connect axial end contacts of the at least one battery with the PCB for powering the electronics and/or sensors by the at least one battery,
wherein the at least one battery is arranged at a distance to the PCB,
wherein each of the elongate connector elements comprises a first end section, that is connected to the PCB, a contact section configured to be connected to one of the end contacts of the at least one battery, and a second end section,
wherein the electronics housing comprises inward protrusions, and
wherein the second end sections of the at least one pair of elongate connector elements abut axially against the inward protrusions.

2. The flow meter of claim 1, wherein the second end sections of the at least one pair of elongate connector elements are shaped away from each other towards the inward protrusions.

3. The flow meter of claim 1, wherein the second end sections of the at least one pair of elongate connector elements are resiliently deformed and preloaded by axially abutting against the inward protrusions.

4. The flow meter of claim 1, wherein the electronics housing comprises a housing bottom, wherein there is a gap between the at least one battery and the housing bottom.

5. The flow meter of claim 1, wherein there is an empty volume portion between the at least one battery and the PCB.

6. The flow meter of claim 1, wherein components of the electronics on the PCB project from the PCB into a volume portion between the at least one battery and the PCB.

7. The flow meter of claim 1, wherein the at least one battery is held at the distance to the PCB by the at least one pair of elongate connector elements alone.

8. The flow meter of claim 1, wherein the at least one battery is wedged between the flow tube and the electronics housing, the inward protrusions forming an inner surface of the electronics housing, wherein the inward protrusions define a portion of an interior space of the electronics housing.

9. The flow meter of claim 1, wherein the electronics housing defines a lower volume below the PCB, wherein the lower volume tapers in a downward direction.

10. The flow meter of claim 1, wherein the electronics housing comprises at least one recess receiving a rim of the at least one battery for fixing the at least one battery in a lateral direction and/or an axial direction and/or a downward direction.

11. The flow meter of claim 1, wherein the at least one battery has an essentially cylindrical shape defining a battery diameter, wherein the sensors are arranged at a sensor wall of the flow tube, wherein the sensor wall is distanced from a housing bottom of the electronics housing by more than the battery diameter.

12. The flow meter of claim 9, wherein the sensor wall comprises at least one flat sensor surface on which the sensors reside, wherein the at least one flat sensor surface extends in parallel to a housing bottom.

13. The flow meter of claim 1, wherein the sensors are arranged on the PCB and/or essentially in the same plane as the electronics on the PCB.

14. The flow meter of claim 1, wherein the second end sections of the at least one pair of elongate connector elements are bent and/or folded away from the at least one battery towards the inward protrusions.

15. The flow meter of claim 1, wherein the contact section of each elongate connector element is arranged between the first end section of the elongate connector element and the second end section of the elongate connector element.

16. The flow meter of claim 1, wherein the contact section of each elongate connector element of the at least one pair of elongate connector elements is welded or brazed to one of the end contacts of the at least one battery.

17. The flow meter of claim 1, wherein each elongate connector element of the at least one pair of elongate connector elements is form-stiffened at the first end section and/or the second end section and/or the contact section.

18. The flow meter of claim 1, wherein each elongate connector element of the at least one pair of elongate connector elements is a press-formed metal strip, wherein the second end section of the elongate connector element is bent and/or is folded once or more times and in sum by a total angle of 90° or more.

19. The flow meter of claim 1, wherein the second end sections of the at least one pair of elongate connector elements are resiliently deformed towards the at least one battery when squeezed into the inward protrusions during assembly of the flow meter.

20. The flow meter of claim 1, wherein the at least one battery and the at least one pair of elongate connector elements are arranged as a pre-assembled sub-unit, wherein the contact sections of the at least one pair of elongate connector elements is welded or brazed to the end contacts of the battery, wherein the second end sections of the at least one pair of elongate connector elements project beyond an outer perimeter of the battery, so that the pre-assembled sub-unit is configured to stand on the second end sections of the pair of elongate connector elements.

\* \* \* \* \*